(12) United States Patent
Able et al.

(10) Patent No.: US 7,012,390 B1
(45) Date of Patent: Mar. 14, 2006

(54) METHOD AND APPARATUS FOR CONTROLLING A VARIABLE SPEED FAN IN AN IMAGE FORMING DEVICE

(75) Inventors: Douglas Anthony Able, Shelbyville, KY (US); David Herman Alverson, Lexington, KY (US); Danny Keith Chapman, Sadieville, KY (US); David Ross Cutts, Jr., Lexington, KY (US); Brian Michael Jacobs, Lexington, KY (US); Matthew David Miles, Lexington, KY (US); Michael Todd Phillips, Frankfort, KY (US); Benjamin Kyle Shepherd, Versailles, KY (US); Mark Stephen Underwood, Lexington, KY (US); Marshall Lee White, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 96 days.

(21) Appl. No.: 10/959,386

(22) Filed: Oct. 6, 2004

(51) Int. Cl.
*H02P 1/00* (2006.01)
(52) U.S. Cl. ...................................... 318/268; 318/732
(58) Field of Classification Search ................ 318/732, 318/772, 810, 729, 767, 778, 779, 781, 800, 318/816, 830, 268
See application file for complete search history.

(56) References Cited

U.S. PATENT DOCUMENTS 5,696,432 A * 12/1997 Poeppel ...................... 318/732

* cited by examiner

*Primary Examiner*—Karen Masih
(74) *Attorney, Agent, or Firm*—Frederick H. Gribbell, LLC

(57) ABSTRACT

An improved variable speed fan controller for use in devices such as laser printers. The controller automatically adjusts its output signal to fans such that a fan quickly settles into an appropriate operating speed, even if the fan has been newly installed into the equipment. The controller can store values in non-volatile memory, if desired, to keep track of recent changes in the fan's operating parameters and corresponding control signal values. The controller is able to control relatively inexpensive fans that don't necessarily operate at a predictable fan rotating speed under repeatable conditions and control signals, by controlling the fan to an initial or predetermined rotating speed; if the fan isn't running within a suitable range of rotational speeds, then determining whether a fine or coarse adjustment should be made to the fan's rotational speed. The controller makes appropriate adjustments until the fan's rotational speed is within acceptable operating tolerances.

23 Claims, 3 Drawing Sheets

METHOD AND APPARATUS FOR CONTROLLING A VARIABLE SPEED FAN IN AN IMAGE FORMING DEVICE

TECHNICAL FIELD

The present invention relates generally to image forming equipment and is particularly directed to equipment of the type which includes a fan for cooling. The invention is specifically disclosed as a variable speed fan and controller that quickly settles into an appropriate operating speed, even if the fan has been newly installed into the equipment.

BACKGROUND OF THE INVENTION

In many modern electronic devices a cooling fan is used to regulate the temperature of the device during operation. In most laser printers, this is an especially important design element due to the presence of an active heating element, typically a fuser that melts the toner to the paper. In such equipment, the cooling fan must be controlled in such a way so as to strike a suitable balance between two competing goals of controlling the internal temperature of the device and minimizing the acoustic impact of the device upon its environment. The designer can always install a fan that blows more air, but this approach quite often causes a greater noise level that usually is undesirable.

In laser printers, for example, it is common practice to operate an internal cooling fan at more than one speed, tailoring the fan's operation to the needs of the printer in each of its operating modes. For example, one might operate the fan at a high speed during active printing operations to ensure maximum cooling efficiency, but then change to a slower (and quieter) speed during an "idle" mode, and perhaps turn the fan off for a "power saver" mode. The nominal operating speed of the fan in each mode typically is chosen to ensure adequate cooling under worst-case variations of printer temperature and variations in fan operating characteristics.

Cooling fans, like all manufactured devices, may exhibit significant variation from unit to unit in their response to control stimulus. For example, one particular fan may run at 2400 RPM in response to a given control signal, and another fan of the same design may run at 2500 RPM, given the same control signal input. This variation in operating response is generally outlined in the published operating specifications for the fan unit, as tested and reported by the fan manufacturer. The system designer who desires a particular nominal operating speed (or speeds if there is more than one operating mode) of the fan within a device must take into consideration these variations in control response in order to ensure proper operation of the fan. These variations may be amplified by the potentially nonlinear response of the fan to the host device's control circuit, and by manufacturing variances in the control circuit itself. Any nominal operating speed chosen must also account for these variations.

Many fans commonly available provide a feedback signal to the host device which gives an indication both that the fan is indeed running and not stalled, and that the fan is running at a particular RPM speed. This type of feedback signal, when available in a particular fan, will be referred to herein as a "tach signal" or a "tachometer signal." A common embodiment of this type of tach signal in conventional low-cost fans is a simple-buffered feedback of one of the coil switching outputs of the fan's internal motor controller. Such a feedback signal would appear as a pulse train, similar to a "clock" signal, at a frequency on the order of two-times to four-times (2×–4×) the fan's RPM, depending on the number of poles in the fan motor and other motor design characteristics.

Many conventional fans used in printers typically include internal motor control logic that maintains the fan motor at a stable, consistent speed given its external control input. If available, the "tach" feedback signal provided to the controlling system is usually intended as a means of monitoring the fan's operation, but not necessarily as a means of actively controlling the fan's speed. The frequency of the "tach" signal in these low cost fans is generally too low to provide enough information for a host device to use conventional motor control means for actively controlling the speed of the fan.

In applications where operational consistency in either acoustics or precise fan RPM (or both) is of concern, it is desirable for the host device to have some means for controlling the fan RPM in such a way that manufacturing and environmental variations from fan to fan, as well as nonlinearity of the fan's control response, are minimized or eliminated. Since the typical feedback signal from low-cost fans has been inappropriate for traditional control means, it would be an improvement to provide a control circuit and operating method that would allow suitable control of such fans while using the low-frequency tach feedback signal that is commonly available in such fans.

SUMMARY OF THE INVENTION

Accordingly, it is an advantage of the present invention to provide a fan control circuit and operating method that provides suitable control of inexpensive fans that exhibit a low-frequency tachometer output signal.

It is another advantage of the present invention to provide a fan control circuit that provides an initial output signal to drive an inexpensive fan to an initial rotational speed, and then by using a low-frequency tachometer feedback signal provided by the fan, automatically adjusts the actual fan speed if needed, so that the final fan speed is within a predetermined range.

It is a further advantage of the present invention to provide a fan control circuit that provides a DC control signal for an inexpensive fan, and then receives a tachometer feedback signal and conditions that feedback signal into a logic signal that is suitable for use with low-voltage level logic, including microcomputers and microprocessors.

It is yet another advantage of the present invention to provide a fan control circuit and operating method that determines an actual fan rotating speed and compares that to a desired fan rotating speed, then automatically makes adjustments to the fan speed if necessary, and further stores additional operating parameters into a non-volatile memory for future use by the fan control circuit.

It is still another advantage of the present invention to provide a fan control circuit and operating method that initially controls an inexpensive fan to an initial rotating speed, then determines if that fan is running within a suitable range of rotational speeds, and if not, determines if a fine adjustment should be made to the fan's rotational speed, and if not, determines whether a coarse adjustment should be made to the fan's rotational speed, and then makes the appropriate adjustments until the actual fan rotational speed is within acceptable operating tolerances.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, a method for controlling a variable speed fan is provided, in which the method comprises the following steps: (a) providing a variable speed fan and a fan control circuit, wherein the fan control circuit includes: a processing circuit, a memory circuit, an output circuit that generates a control signal to the fan, and an input circuit that receives a speed signal from the fan; (b) communicating the control signal having an predetermined value to the fan; (c) receiving the speed signal from the fan that indicates an actual rotating speed of the fan, based upon the predetermined value of the control signal; (d) determining if the fan actual rotating speed is within a predetermined range of acceptable operating speeds, and if not, determining if the fan requires one of: (i) a fine adjustment to the rotating speed, and (ii) a coarse adjustment to the rotating speed; (e) adjusting a value of the control signal according to one of the fine adjustment and the coarse adjustment, and communicating the adjusted control signal to the fan; and (f) repetitively: performing the determining step (d) and the adjusting step (e), as needed, until the fan actual rotating speed is within the predetermined range of acceptable operating speeds.

In accordance with another aspect of the present invention, a fan control circuit is provided, used with a variable speed fan that outputs a speed signal, which comprises: a processing circuit; a memory circuit; an output circuit that generates a control signal to the fan; an input circuit that receives the speed signal from the fan, wherein the speed signal comprises a plurality of pulses at voltage levels and noise levels that are not suitable for direct interfacing to an electronic logic circuit; a signal conditioning circuit that converts the fan speed signal into a low-level logic signal that is suitable for interfacing to an electronic logic circuit, wherein the low-level logic signal is representative of the speed signal; a frequency-determining circuit that receives the low-level logic signal, wherein the frequency-determining circuit determines a frequency of rotation of the fan from the low-level logic signal, and communicates the frequency value to the processing circuit, for use in determining a value for the control signal.

In accordance with yet another aspect of the present invention, a fan control circuit is provided, used with a variable speed fan that outputs a speed signal, which comprises: a processing circuit; a memory circuit; an output circuit that generates a control signal to the fan; an input circuit that receives the speed signal from the fan; wherein the processing circuit is configured: to communicate the control signal having an predetermined value to the fan; to receive the speed signal from the fan that indicates an actual rotating speed of the fan, based upon the predetermined value of the control signal; to determine if the fan actual rotating speed is within a predetermined range of acceptable operating speeds, and if not, to determine if the fan requires one of: (i) a fine adjustment to the rotating speed, and (ii) a coarse adjustment to the rotating speed; to adjust a value of the control signal according to one of the fine adjustment and the coarse adjustment, and to communicate the adjusted control signal to the fan; and to repetitively: determine if the fan actual rotating speed is within a predetermined range of acceptable operating speeds, and if not, determine if the fan requires one of: (i) a fine adjustment to the rotating speed, and (ii) a coarse adjustment to the rotating speed; and adjust a value of the control signal according to one of the fine adjustment and the coarse adjustment, and to communicate the adjusted control signal to the fan, as needed, until the fan actual rotating speed is within the predetermined range of acceptable operating speeds.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

As noted above, conventional control circuits and fan designs used in relatively inexpensive electrophotographic or "EP" printers (e.g., laser printers) may allow the possibility of a relatively wide variation in fan speed for a given output control signal from the controller, due to variation in manufacturing tolerances and other parameters. In addition, the fan's response to a received control input signal may be non-linear, due to either the fan's design or to its interaction with the host device's control circuitry. A given fan typically is assumed to operate consistently with itself over time within an assumed tolerance (although there can be some thermal drift), but it is desirable that fan-to-fan variation be minimized in the system. The present invention uses a "Fan Supervisor" control algorithm which uses closed loop feedback of the fan's RPM speed (via a tach feedback signal), and provides software control for adjusting its control output signal to bring the fan to a desired RPM, while minimizing the effects of manufacturing tolerances, environmental effects, and system nonlinearities.

Figure 1:
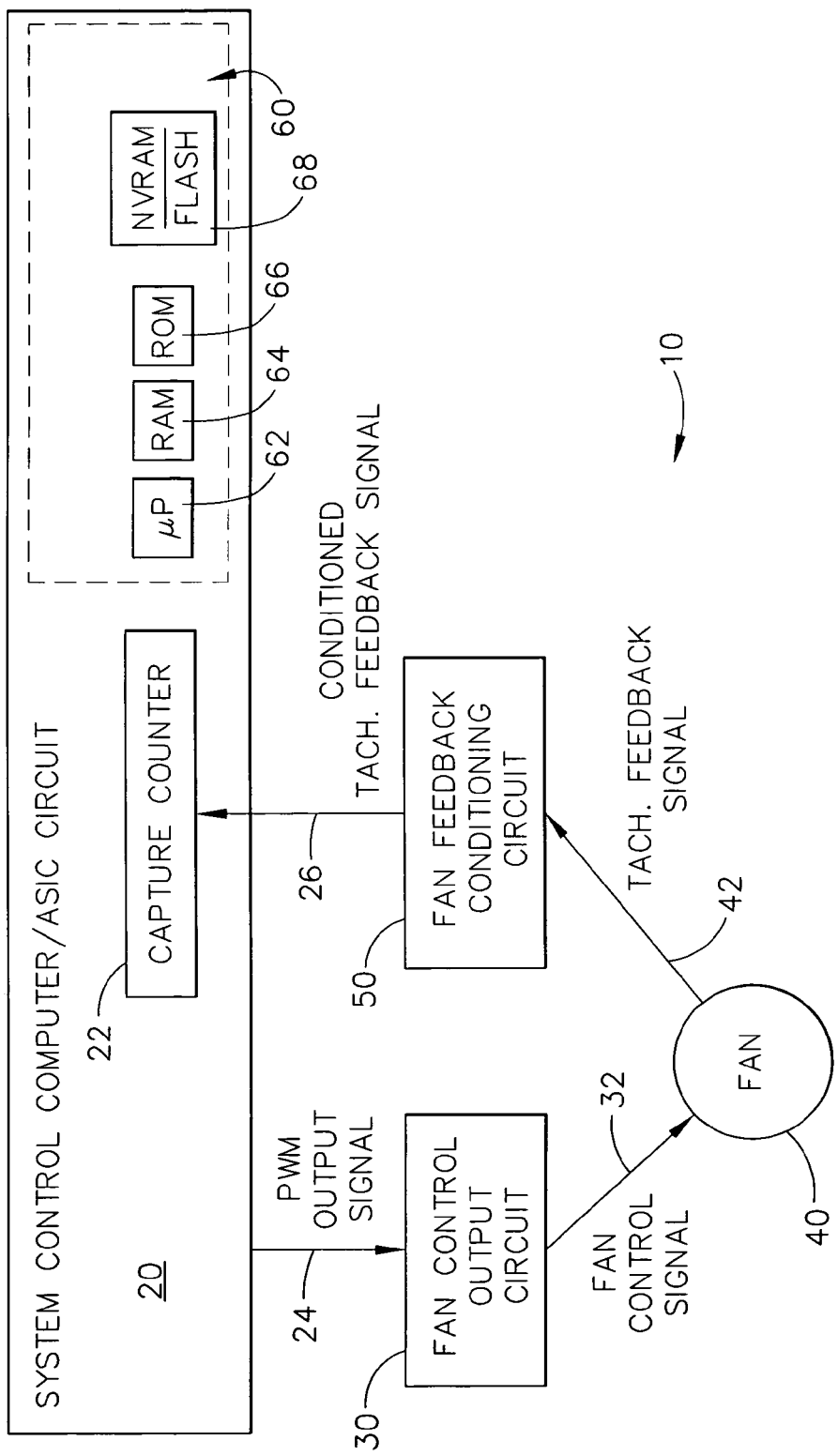
FIG. 1 is a block diagram of some of the major components of a fan control subsystem used in a device such as a printer, as constructed according to the principles of the present invention.

Referring now to FIG. 1, the main hardware used for controlling a fan of an image forming apparatus, and is generally designated by the reference numeral 10. The main system control computer is designated by the reference numeral 20, and this could be included in an ASIC (Application Specific Integrated Circuit). Of course, the main processing device could be separate from the printer's main ASIC, or that processing device could be included in the ASIC. The software control algorithm that is described below will be used to control the execution of the process controller, and one of its control functions is to provide a fan control output signal. On FIG. 1, this output control signal is at 24, and in a preferred mode of the present invention, this output signal is a Pulse-Width Modulated (PWM) electrical signal.

The system controller computer/ASIC device 20 will typically include some type of processing device with associated memory, generally designated by the reference numeral 60. The processing circuit component of the system control computer 20 would typically include a microprocessor or a microcontroller 62, which would work with some associated memory, such as Random Access Memory (or RAM) 64. The processing circuit 62 would also typically work with some type of Read Only Memory (or ROM) 66 that stores executable instructions that control the functions of the microprocessor or microcontroller 62. In addition, the memory circuit can include other types of memory devices, such as non-volatile RAM (or NVRAM) 68, which typically would comprise some type of electrically alterable Read Only Memory chip such as EEPROM. An alternative type of non-volatile memory could be Flash memory, which is another type of EEPROM memory device at 68.

Output signal 24 is received by a fan control output circuit 30, which converts the PWM signal into a DC voltage that is suitable for driving the fan itself. This fan control signal is at 32, and is directed to the fan 40. Depending upon variations in operating conditions and in the tolerances of the fan itself, fan 40 will run at a particular rotation speed based on this fan control signal 32. As noted above, the relatively inexpensive types of fans used in devices such as laser printers can have a fairly wide variation in fan speeds based on a particular control voltage being supplied at the fan control signal 32. The present invention takes this into account by providing closed-loop feedback.

The fan 40 provides a tachometer feedback signal 42, which typically is a pulsed voltage signal that is switched at one of the motor coils of the fan. This is a very "noisy" signal in the case of most inexpensive fans, and it is not at all suited for driving into relatively sensitive control circuits. Accordingly, the present invention includes a fan feedback conditioning circuit 50. This converts the poorly-shaped pulse signal that represents the waveform of the fan's tachometer feedback signal and converts it into a logic level signal that has a suitable waveform and logic level for use in the system's control computer/ASIC 20. This conditioned tachometer feedback signal is designated 26, and is directed to a "capture counter" 22 that is part of the system control computer or ASIC circuit 20.

The conditioned tachometer feedback signal 26 is preferably shaped and conditioned to exhibit a square wave pulse train, which can be easily detected by the input circuits of many various types of control logic. The capture counter 22 receives this pulse train, and essentially keeps track of how many pulses are received over a given time period. In one mode of the present invention, capture counter 22 is an edge-to-edge period counter, that counts rising edges during a predetermined time interval. Since the time interval is predetermined and thus known to the control system 10, the frequency of the tachometer feedback signal becomes a determined quantity for use by the control software. An alternative method for determining this frequency is for a different type of "capture counter" to measure the time interval between received pulses, which is a preferred mode of the present invention.

It will be understood that many different types of control logic could be used, including TTL, CMOS, and other types of MOS transistor circuitry, particularly for the system computer and/or ASIC 20, without departing from the principles of the present invention.

The fan control output is a common PWM (pulse-width modulated) output signal that is converted to a DC voltage for controlling the fan speed. In one mode of the invention, the precision of the PWM output is at 256 levels, using 8-bit numeric values in the control software, and the base frequency for the PWM output pulses is 48 kHz. Naturally, a different precision could be used, either finer or coarser, without departing from the principles of the present invention; similarly, a different base frequency could be used for a design criterion, without departing from the principles of the present invention.

The fan tach feedback is a signal generated by the fan that provides an output pulse a known number of times (commonly twice or four times) per revolution of the fan. The period of this tach feedback signal is measured by a capture timer inside the printer system ASIC, and gives an indication to the control software of the RPM of the fan motor during any given time period.

Figure 3:
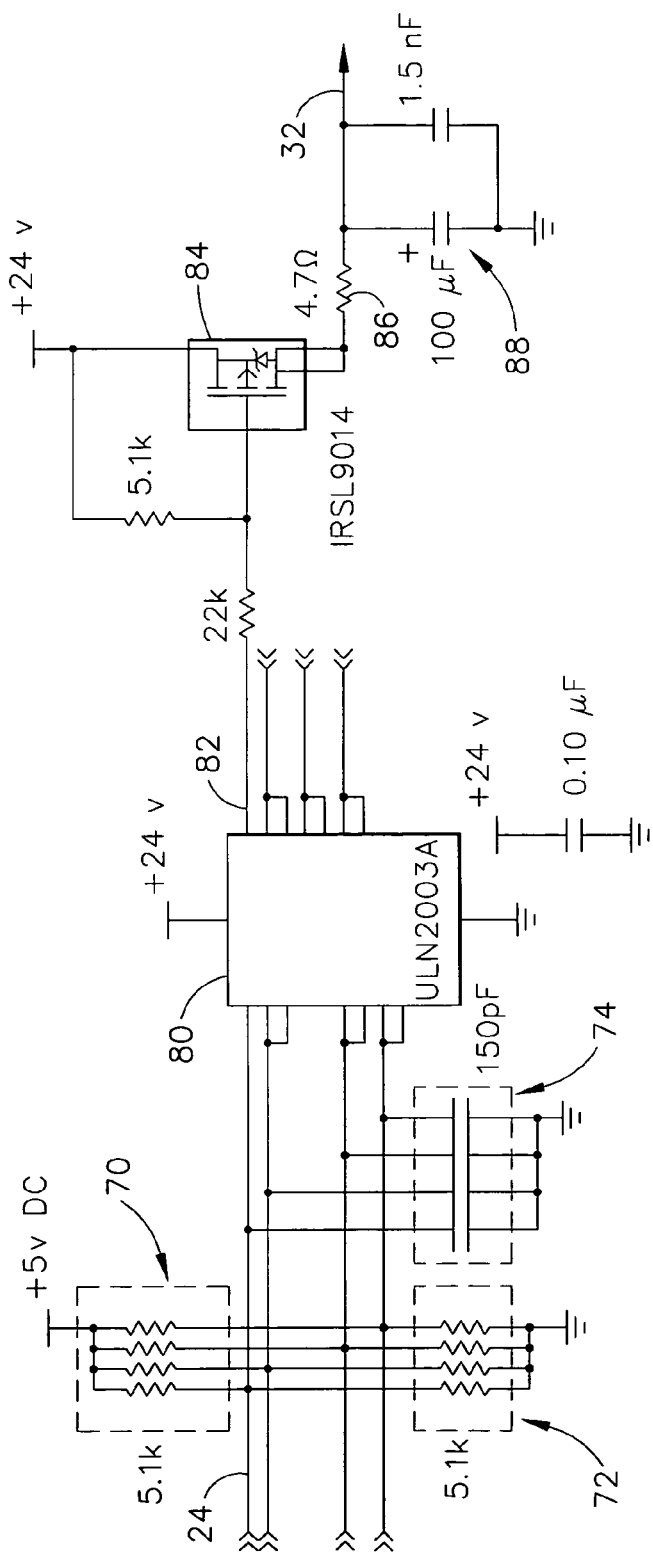
FIG. 3 is an electrical schematic diagram of a fan control output circuit, used in the fan control subsystem of FIG. 1.

Referring now to FIG. 3, the PWM output signal 24 enters the schematic diagram of FIG. 3 from the left and can be "connected" to a +5 volt DC power supply rail through one of the resistors in a resistor array 70, acting as a pull-up resistor. This signal 24 also can be "connected" or pulled down to the ground or DC common rail by a resistor in a different resistor array 72. It is also somewhat signal-conditioned by a capacitor in an array of small capacitors 74. In a preferred embodiment of the present invention, signal 24 is pulled down by a resistor in the array 72, while the resistor array 70 is not populated (thus leaving an open circuit between signal 24 and the +5 volt DC rail).

The PWM output signal 24 is directed to a set of Darlington transistor drivers in an integrated circuit 80. In a preferred mode of the present invention, IC 80 comprises a transistor array, using an industry standard part number ULN2003A. This PWM signal is then output at the signal line 82, where it has now been transformed into a 24 volt DC signal. It will be understood that these 5 volt and 24 volt signals are actually pulse-type signals, even though they are described as being "DC" signals. If the duty cycle of the signal 24 happened to be running at 100%, then the signal 24 would be a constant +5 volt signal, truly a DC signal. The same for the signal 82, in which its constant voltage would be +24 volts DC if its duty cycle was running at 100%.

The pulse signal 82 is directed to an FET transistor 84, and on the output side of this driver transistor 84 the signal passes through a filter composed of a resistor 86 and capacitors 88. The pulse-type signal 82 now becomes a true DC signal 32, which is the fan control signal that is directed to fan 40 to control its speed. (Note, this DC signal 32 will likely exhibit ripple.) In a preferred mode of the invention, FET 84 comprises part number IRSL9014 (an International Rectifier part number).

Figure 4:
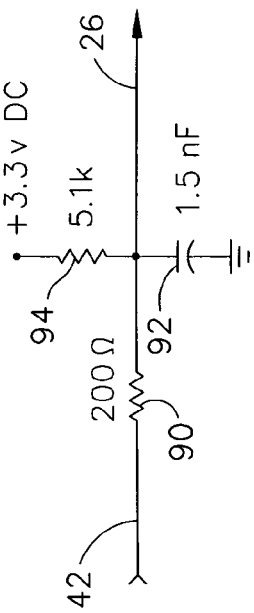
FIG. 4 is an electrical schematic diagram of a fan feedback conditioning circuit, used in the fan control subsystem of FIG. 1.

Referring now to FIG. 4, the feedback signal 42 that is produced by the fan 40 enters the schematic diagram from the left, and passes through a low-pass filter made of a resistor 90 and a capacitor 92. There is also a pull-up resistor 94, which is connected to a +3.3 volt DC power supply.

After the pulsed tachometer feedback signal 42 passes through this low-pass filter, it now has been conditioned into a signal with much fewer harmonics and a much better waveform shape. In addition, its peak voltage will now be 3.3 volts DC, as it becomes the conditioned tachometer feedback signal 26. It is this signal 26 that is presented to the capture counter 22 of FIG. 1, and since it has been considerably "cleaned up," the capture counter 22 will be less prone to producing false readings or double counts. Further "clean up" of the signal which is output from the capture counter can be accomplished using a software filter.

Figure 2:
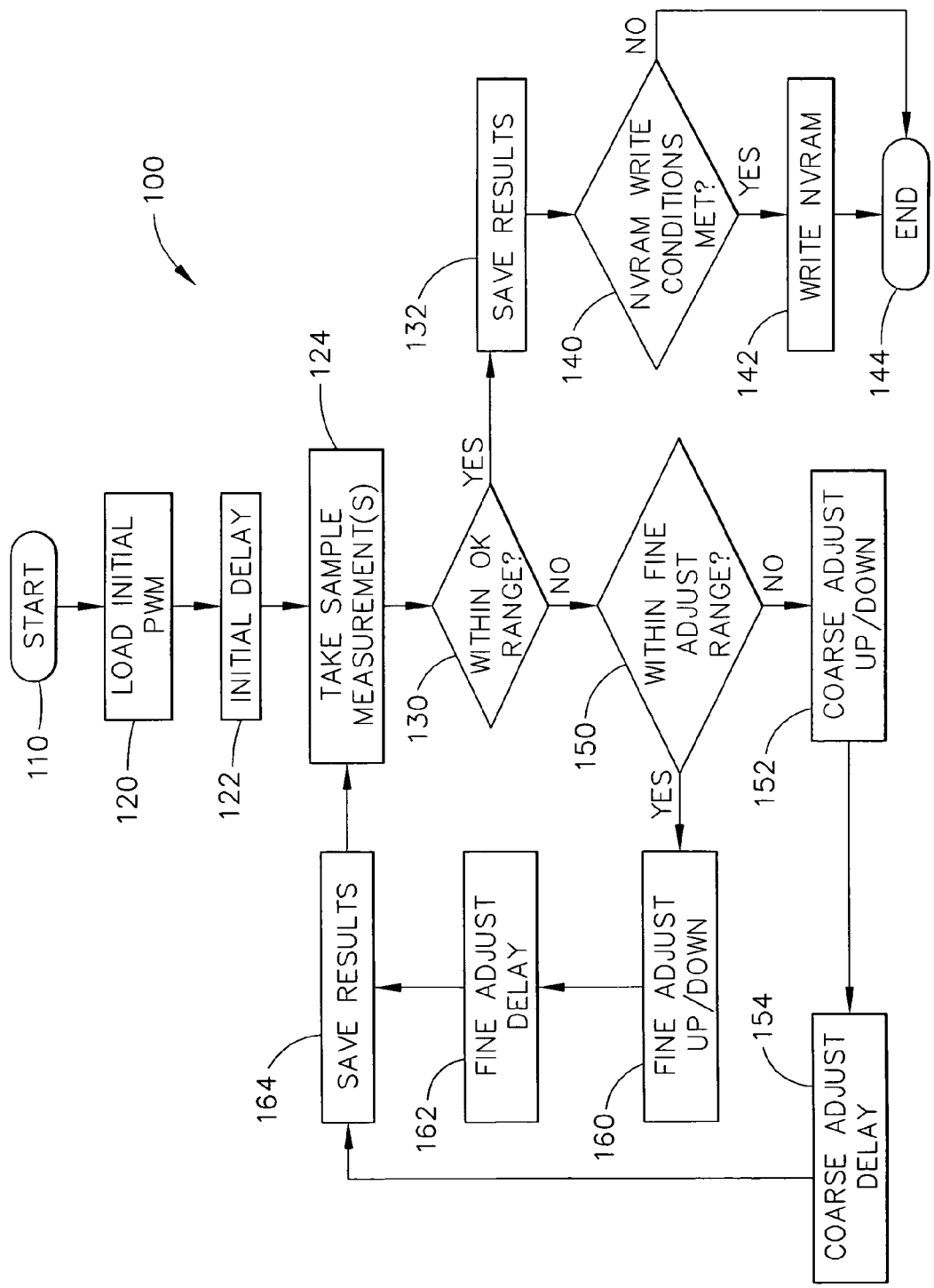
FIG. 2 is a flow chart of some of the steps performed by a fan supervisor control algorithm that is used with the fan control subsystem of FIG. 1.

Referring now to FIG. 2, a flow chart 100 is provided showing some of the important steps or functions performed by the "fan supervisor" control algorithm. Starting at a step 110, the control logic loads an initial (or otherwise predetermined) value for the fan control output signal, and in a preferred mode of the invention, this output signal is a Pulse-Width Modulated (PWM) output signal, at a step 120. A default PWM is typically used for this initial value, and for example, if the precision of the PWM signal is 8-bit precision, having a range of numeric values from 0–255, then the initial PWM may have a value of around 70 or 80, out of the possible 255 maximum value. This PWM initial value may represent a "target" rotational speed of the fan of, for example, 2400 RPM. As discussed above, the target RPM could be quite different for operating conditions that may involve different modes of a particular EP printer, or for different sizes or manufacturers of fans. Of course, this is taken into account by the system designer.

A step 122 now provides an initial delay, which is utilized to allow the fan speed to settle to a more or less steady-state rotational speed. In one mode of the present invention, the initial delay would be around seven (7) seconds. Naturally, the exact time interval used for the initial delay step 122 can vary according to different types and manufacturers of fans, and different system operating conditions, all without departing from the principles of the present invention.

A step 124 now samples the rotational speed of the fan, using the conditioned tachometer feedback signal 26 that is directed to the capture counter 22. A decision step 130 now determines if the sample measurement that was taken is within an acceptable range, such as ±5% of an expected frequency or RPM rotational speed of the fan. If not, then a decision step 150 determines whether or not the sample measurement that was taken is within a "fine adjust range," which could be on the order of ±10%. If not, then a step 152 makes a coarse adjustment to the output speed by controlling the PWM output signal 24. This coarse adjustment will either increase or decrease the duty cycle of the PWM output signal, depending of course on whether the sample measurement of the rotational speed was greater than or less than the desired/expected rotational speed.

If a coarse adjustment is made at step 152, then a step 154 provides a certain time delay to allow the fan speed to settle after the new control output signal has been given to the fan. This time delay could be quite short, such as one-half second in duration, or it could be longer, such as seven seconds in duration, depending upon the mechanical fan system, and upon other operating criteria. After the time delay interval has expired, the logic flow will continue to take the next sample measurement at step 124. In addition, the "results" of the coarse adjustment could be saved in memory at a step 164. In general, the type of memory for saving this information would typically be in RAM, such as the RAM 64 in the system control computer and/or ASIC 20.

If the sample measurement was within the "fine adjust range" at decision step 150, then the logic flow would be directed to a step 160 where a "fine" adjustment would be made to the PWM output signal to either increase or decrease the fan speed. After that has occurred, a step 162 would provide another time delay, which would be to allow the fan speed to settle after the fine adjustment had been made to the PWM output signal. The time interval for this fine adjustment delay could be the same as in the coarse adjustment delay at step 154, or it could be a different time interval, depending upon the mechanical characteristics of the fan, and other operating parameters of the system. Once the delay interval has expired at step 162, then the next sample measurement would be taken at step 124, and also the results of the fine adjustment could be stored in memory at step 164. Again, this results saving step 164 would likely place the "new" output signal value into RAM, such as RAM 64.

If the fan speed was within the original "OK range" at decision step 130, then the results of the output signal and sample measurement could be saved at a step 132. Again, this output signal value "result" would likely be saved in RAM, such as RAM 64. At this step in the logic flow, the fan is running within its desired tolerance of rotational speed, and it may be desired to save the operating parameters in a non-volatile memory, particularly if there have been either fine adjustments or coarse adjustments made to the output signal value for these operating parameters. A decision step 140 will now determine if the "write conditions" have been met for storing this information into a non-volatile memory. If the conditions are met, a step 142 will store this information into a non-volatile memory location, such as in an NVRAM memory or a Flash memory, such as the non-volatile memory 66 of the system control computer/ASIC 20.

On the other hand, if the non-volatile write conditions were not met at decision step 140, then the logic flow skips the step where the values are stored into a non-volatile memory (i.e., will skip step 142). The logic flow will now be directed to the end of this routine at 144 on the flow chart 100.

The above description of the flow chart 100 logic provides information about the basic logic decisions used by the present invention. Some further descriptive information follows: when the software of the device executes the fan supervisor control algorithm, it begins with a "best guess" initial output PWM (at step 120) that has been selected to ensure that the fan will start in all cases, and will start near a "target frequency" for (statistically) nearly all fans in the population of fans of the model to be used in this device. The algorithm then determines whether the fan is actually running within expected rotational speed parameters at step 130. If not, the algorithm then progressively increases or decreases the PWM output signal 24 (and therefore the DC voltage of the signal 32 that is sent to the fan) as needed to cause the fan speed to approach the desired target RPM. This increase/decrease of the signal value uses the fine adjust or coarse adjust steps, as desired by the system controller.

As the increase/decrease adjustment steps are executed, if the difference between desired and actual RPM is greater than the fine adjust threshold range (e.g., ±10%), a relatively large change in PWM output (at step 152) is used to cause the logic to converge quickly. Once within the fine adjust range, the fan supervisor control algorithm will change the output by smaller steps up or down (at step 160). After each change in PWM output, the algorithm will pause for a sufficient time (at step 154 or step 162) to allow the fan to stabilize at its new RPM before re-evaluating that speed with respect to the desired RPM (at step 130). Once the actual fan speed is within the so-called "OK range" (e.g., ±5%) of the desired value, the algorithm will stop adjusting the fan control output, and will allow the fan to maintain this "final" speed.

It will be understood that the size (tolerance) of the predetermined "fine adjust range" and the "OK range," the delay times, and the sizes of the step increases and step decreases of the PWM values that are used in each of these adjustment cycles may be selected by the system designer to match a particular manufacturer's fan specifications, and the needs of the device (e.g., an EP printer) in which this algorithm is used. Each of the above parameters may also have a unique value for each target RPM to be used in a particular device (e.g., printing speed, idle speed, etc. for an EP printer) to account for the nonlinear fan control response that one can expect with such fans.

It will be further understood that the number of control ranges can be more that the two ranges described above (e.g., the "fine" range and the "coarse" range), without departing from the principles of the present invention. For example, there could be three (or more) control ranges, such as "fine", "medium", and "coarse". The "medium" range could be considered an "intermediate" range, or there could be multiple medium or intermediate ranges, if desired. The ranges would typically be nested, such that the fine range is smaller than the coarse range, and the one or more intermediate ranges would be smaller than the coarse range, but larger than the fine range. Moreover, there would always be at least a fine range and a coarse range of adjustments, to more quickly achieve a proper fan speed once it was determined that the actual fan speed needed to be adjusted.

Once a "final" PWM output value is determined, it can be stored in memory for use as the initial PWM value for the next fan speed change, when that operating condition occurs. This final PWM value, or a value derived from it, can be conditionally stored in non-volatile memory, to be used as the initial (or otherwise predetermined) value the next time the device (e.g., an EP printer) is started. In this fashion, the device essentially adapts itself to the particular fan that has been installed, and thus maintains some history of this particular fan's performance.

The control scheme of the present invention can be invoked every time a different fan speed is desired, for example, when changing printer modes of operation. In addition, the control algorithm of the present invention can be periodically invoked even if the printer mode has not changed at all, for example to periodically correct for any possible thermal drift effects in the fan's operating behavior. In such a circumstance, the "initial" value at step 120 of FIG. 2 would typically be the most recent "running" PWM value of the printer's fan, regardless as to whether or not the NVRAM write conditions were earlier met at step 140. Many possible variations in the control scheme are possible, while remaining within the scope of the present invention.

In the event of a fan replacement, the fan supervisor control algorithm will automatically adapt to the new fan's characteristic after the first cycle through the logic steps. An example condition for deciding whether to store a "final" PWM output value (as a "solution") to non-volatile memory would be whether the solution varies significantly from a previous solution already stored. Another example condition for deciding whether to store a "final" PWM output value would be the actual real time that has run since a previous "final" output value has been stored, particularly if the non-volatile memory device has a known maximum number of write cycles available before wearing out. In this manner, the overall set of conditions for deciding whether to store a "final" PWM output value would be intended to allow the fan supervisor control algorithm to interact favorably with limitations of the non-volatile memory subsystem. It will be understood, however, that these "storing" conditions are not directly material to the functions of controlling the successful operation of the fan speed when using the fan supervisor control algorithm of the present invention.

In an alternative mode of the invention, it also can be used to allow for instances in which the printer's operation does not allow sufficient time at a given operating point (e.g., printing, idle, etc.) for the fan supervisor control algorithm to come to a final PWM output value solution. When that circumstance occurs, each intermediate output value can be stored in memory and subsequently used as a starting point the next time the printer enters that particular operating point. In this manner, the fan supervisor control algorithm may converge to a final PWM output value solution for each operating mode, despite frequent changes between modes. This type of operational control of an actual device can effectively use the present invention for many types of devices, including devices other than printers.

In one mode of the invention, the fan operating mode is selected by a separate "fan management" control algorithm that is not discussed in detail herein, but is disclosed in another patent application commonly-assigned to Lexmark International, Inc., titled "System for Controlling Printer Cooling Fan," Ser. No. 10/968,391, filed on Oct. 19, 2004, which is incorporated herein by reference in its entirety. This separate control algorithm monitors the overall printer operation and determines the appropriate running speed for the fan.

Depending upon the higher-level printer control, there may be any number of printer operating points for which a potentially unique fan RPM may be specified. Generally, the majority of these RPM values are redundant, as the same fan operating point will suffice for a variety of printer operating modes. For example, in one laser printer manufactured by Lexmark, there a total of 73 different operating modes for which a fan speed can be specified, but there are only four (4) unique fan RPM settings needed among these 73 operating modes. In order to avoid data redundancy and unnecessary iteration of the fan supervisor algorithm, the printer's overall fan supervisor control system can map these many printer operating modes to a much smaller known set of fan RPM settings.

One embodiment of the present invention has been tested with various inexpensive fans of the types described above, particularly for use in future or existing Lexmark laser printers. The tested embodiment has demonstrated that it can successfully remove fan RPM variations due to differences between fans (including those of the same model), differences in control circuits (including those of the same design), and differences in environmental conditions. As noted above, the application of this invention is not limited to printers, but can be used with any device that uses active cooling with a fan that provides a tach feedback signal that is representative of fan rotational speed.

It will also be understood that the logical operations described in relation to the flow chart of FIG. 2 can be implemented using sequential logic, such as by using microprocessor technology, or using a logic state machine, or perhaps by discrete logic; it even could be implemented using parallel processors. One preferred embodiment may use a microprocessor or microcontroller (e.g., microprocessor 62) to execute software instructions that are stored in memory cells within an ASIC (e.g., ASIC 20). In fact, the entire microprocessor or microcontroller 62 along with dynamic RAM (e.g., 64) and executable ROM (e.g., 66) may be contained within a single ASIC, in a preferred mode of the present invention. Of course, other types of circuitry could be used to implement these logical operations depicted in the drawings without departing from the principles of the present invention.

It will be further understood that the precise logical operations depicted in the flow charts of FIG. 2, and discussed above, could be somewhat modified to perform similar, although not exact, functions without departing from the principles of the present invention. The exact nature of some of the decision steps and other commands in these flow charts are directed toward specific future models of printer systems (those involving Lexmark laser printers, for example) and certainly similar, but somewhat different, steps would be taken for use with other types of devices in many instances, with the overall inventive results being the same.

All documents cited in the Detailed Description of the Invention are, in relevant part, incorporated herein by reference; the citation of any document is not to be construed as an admission that it is prior art with respect to the present invention.

The foregoing description of a preferred embodiment of the invention has been presented for purposes of illustration and description. It is not intended to be exhaustive or to limit the invention to the precise form disclosed. Any examples described or illustrated herein are intended as non-limiting examples, and many modifications or variations of the examples, or of the preferred embodiment(s), are possible in light of the above teachings, without departing from the spirit and scope of the present invention. The embodiment(s) was chosen and described in order to illustrate the principles of the invention and its practical application to thereby enable one of ordinary skill in the art to utilize the invention in various embodiments and with various modifications as are suited to particular uses contemplated. It is intended to cover in the appended claims all such changes and modifications that are within the scope of this invention.

The invention claimed is:

1. A method for controlling a variable speed fan, said method comprising:
   (a) providing a variable speed fan and a fan control circuit, wherein said fan control circuit includes: a processing circuit, a memory circuit, an output circuit that generates a control signal to said fan, and an input circuit that receives a speed signal from said fan;
   (b) communicating said control signal having an predetermined value to said fan;
   (c) receiving said speed signal from said fan that indicates an actual rotating speed of said fan, based upon said predetermined value of the control signal;
   (d) determining if said fan actual rotating speed is within a predetermined range of acceptable operating speeds, and if not, determining if said fan requires one of: (i) a fine adjustment to said rotating speed, and (ii) a coarse adjustment to said rotating speed;
   (e) adjusting a value of said control signal according to one of said fine adjustment and said coarse adjustment, and communicating said adjusted control signal to said fan; and
   (f) repetitively: performing said determining step (d) and said adjusting step (e), as needed, until said fan actual rotating speed is within said predetermined range of acceptable operating speeds.

2. The method as recited in claim 1, wherein (a) said predetermined range of acceptable operating speeds is smaller in tolerance than a first range of actual rotating speeds that calls for a fine adjustment, and (b) said first range of actual rotating speeds is smaller in tolerance than a second range of actual rotating speeds that calls for a coarse adjustment.

3. The method as recited in claim 2, wherein said predetermined range of acceptable operating speeds is about ±5% of a nominal targeted operating speed, said first range of actual rotating speeds is about ±10% of said nominal targeted operating speed, and said second range of actual rotating speeds is greater than ±10% of said nominal targeted operating speed.

4. The method as recited in claim 1, after communicating said adjusted control signal to said fan;
   further comprising the step of: waiting a predetermined time interval before performing said determining step (d).

5. The method as recited in claim 1, after determining that said fan actual rotating speed is not within a predetermined range of acceptable operating speeds, and determining that said fan requires one of: (i) a fine adjustment to said rotating speed, and (ii) a coarse adjustment to said rotating speed;
   further comprising the step of: storing the adjusted value of said control signal in said memory circuit.

6. The method as recited in claim 1, after determining that said fan actual rotating speed is not within a predetermined range of acceptable operating speeds, and determining that said fan requires one of: (i) a fine adjustment to said rotating speed, and (ii) a coarse adjustment to said rotating speed;
   and after adjusting the value of said control signal according to one of said fine adjustment and said coarse adjustment, and communicating said adjusted control signal to said fan;
   and after determining that said fan actual rotating speed is within a predetermined range of acceptable operating speeds;
   further comprising the step of: storing the adjusted value of said control signal in said memory circuit.

7. The method as recited in claim 1, wherein during the step (d) of determining if said fan actual rotating speed is within a predetermined range of acceptable operating speeds, and if not, further comprising the steps of:
   determining if said fan requires one of: (i) a fine adjustment to said rotating speed, (ii) a coarse adjustment to said rotating speed, and (iii) at least one intermediate adjustment to said rotating speed; and
   (e) adjusting a value of said control signal according to one of: said fine adjustment, said at least one intermediate adjustment, and said coarse adjustment; and communicating said adjusted control signal to said fan.

8. A fan control circuit, used with a variable speed fan that outputs a speed signal, said fan control circuit comprising:
   a processing circuit; a memory circuit; an output circuit that generates a control signal to said fan; an input circuit that receives said speed signal from said fan, wherein said speed signal comprises a plurality of pulses at voltage levels and noise levels that are not suitable for direct interfacing to an electronic logic circuit; a signal conditioning circuit that converts said fan speed signal into a low-level logic signal that is suitable for interfacing to an electronic logic circuit, wherein said low-level logic signal is representative of said speed signal; a frequency-determining circuit that receives said low-level logic signal, wherein said frequency-determining circuit determines a frequency of rotation of said fan from said low-level logic signal, and communicates said frequency value to said processing circuit, for use in determining a value for said control signal.

9. The fan control circuit as recited in claim 8, wherein said control signal comprises a DC voltage that is communicated to an input of said fan.

10. The fan control circuit as recited in claim 9, further comprising a fan control output circuit that receives a pulse-width modulated signal from said processing circuit, and converts said pulse-width modulated signal into said DC voltage control signal.

11. The fan control circuit as recited in claim 10, wherein said fan control output circuit comprises: (a) a voltage level-shifting circuit that converts said pulse-width modulated signal, received from said processing circuit, from a first maximum pulse voltage to a second, greater maximum pulse voltage signal; and (b) an output transistor that exhibits a first terminal and a second terminal, said output transistor receiving said second, greater maximum pulse voltage signal at said first terminal and outputting said DC voltage control signal at said second terminal, wherein said second terminal is connected to a filter circuit that performs the conversion from a pulse-width modulated signal into said DC voltage control signal.

12. The fan control circuit as recited in claim 8, wherein said speed signal is derived from a motor coil voltage of said fan.

13. The fan control circuit as recited in claim 8, wherein said frequency-determining circuit comprises one of: (a) an edge-to-edge period counter; (b) an element of said memory circuit; and (c) a capture counter.

14. The fan control circuit as recited in claim 8, wherein said signal conditioning circuit comprises a low-pass filter and a pull-up resistor.

15. A fan control circuit, used with a variable speed fan that outputs a speed signal, said fan control circuit comprising:
a processing circuit; a memory circuit; an output circuit that generates a control signal to said fan; an input circuit that receives said speed signal from said fan; wherein said processing circuit is configured:
to communicate said control signal having an predetermined value to said fan;
to receive said speed signal from said fan that indicates an actual rotating speed of said fan, based upon said predetermined value of the control signal;
to determine if said fan actual rotating speed is within a predetermined range of acceptable operating speeds, and if not, to determine if said fan requires one of: (i) a fine adjustment to said rotating speed, and (ii) a coarse adjustment to said rotating speed;
to adjust a value of said control signal according to one of said fine adjustment and said coarse adjustment, and to communicate said adjusted control signal to said fan; and
to repetitively:
determine if said fan actual rotating speed is within a predetermined range of acceptable operating speeds, and if not, determine if said fan requires one of: (i) a fine adjustment to said rotating speed, and (ii) a coarse adjustment to said rotating speed; and
adjust a value of said control signal according to one of said fine adjustment and said coarse adjustment, and to communicate said adjusted control signal to said fan, as needed, until said fan actual rotating speed is within said predetermined range of acceptable operating speeds.

16. The fan control circuit as recited in claim 15, wherein (a) said predetermined range of acceptable operating speeds is smaller in tolerance than a first range of actual rotating speeds that calls for a fine adjustment, and (b) said first range of actual rotating speeds is smaller in tolerance than a second range of actual rotating speeds that calls for a coarse adjustment.

17. The fan control circuit as recited in claim 16, wherein said predetermined range of acceptable operating speeds is about ±5% of a nominal targeted operating speed, said first range of actual rotating speeds is about ±10% of said nominal targeted operating speed, and said second range of actual rotating speeds is greater than ±10% of said nominal targeted operating speed.

18. The fan control circuit as recited in claim 15, wherein after communicating said adjusted control signal to said fan:
said processing circuit is further configured to wait a predetermined time interval before determining if said fan actual rotating speed is within a predetermined range of acceptable operating speeds, and if not, to determine if said fan requires one of: (i) a fine adjustment to said rotating speed, and (ii) a coarse adjustment to said rotating speed.

19. The fan control circuit as recited in claim 15, wherein after determining that said fan actual rotating speed is not within a predetermined range of acceptable operating speeds, and determining that said fan requires one of: (i) a fine adjustment to said rotating speed, and (ii) a coarse adjustment to said rotating speed:
said processing circuit is further configured to store the adjusted value of said control signal in said memory circuit.

20. The fan control circuit as recited in claim 15, wherein after determining that said fan actual rotating speed is not within a predetermined range of acceptable operating speeds, and determining that said fan requires one of: (i) a fine adjustment to said rotating speed, and (ii) a coarse adjustment to said rotating speed; and after adjusting the value of said control signal according to one of said fine adjustment and said coarse adjustment, and communicating said adjusted control signal to said fan; and after determining that said fan actual rotating speed is within a predetermined range of acceptable operating speeds:
said processing circuit is further configured to store the adjusted value of said control signal in said memory circuit.

21. The fan control circuit as recited in claim 15, wherein said speed signal comprises a plurality of pulses at voltage levels and noise levels that are not suitable for direct interfacing to an electronic logic circuit.

22. The fan control circuit as recited in claim 21, further comprising: (a) a signal conditioning circuit that converts said fan speed signal into a low-level logic signal that is suitable for interfacing to an electronic logic circuit, wherein said low-level logic signal is representative of said speed signal; and (b) a frequency-determining circuit that receives said low-level logic signal, wherein said frequency-determining circuit determines a frequency of rotation of said fan from said low-level logic signal, and communicates said frequency value to said processing circuit, for use in determining a value for said control signal.

23. The fan control circuit as recited in claim 22, wherein: (a) said signal conditioning circuit comprises a low-pass filter and a pull-up resistor, and (b) said frequency-determining circuit comprises one of: (i) an edge-to-edge period counter; and (ii) an element of said memory circuit.

* * * * *